Aug. 2, 1932.  W. SCHOENFELD  1,869,716
PIPE CLEANER
Filed Jan. 15, 1932

INVENTOR:
Walter Schoenfeld
BY David E. Carlsen
ATTORNEY.

Patented Aug. 2, 1932

1,869,716

UNITED STATES PATENT OFFICE

WALTER SCHOENFELD, OF ST. PAUL, MINNESOTA

PIPE CLEANER

Application filed January 15, 1932. Serial No. 586,855.

My invention relates to pipe cleaners or pipe clearing devices and is particularly adapted for use in cleaning soil and sewer pipes and the like.

A main object of the device is to provide an electrically heated cleaner adapted first to be inserted in a pipe until it contacts with obstruction therein, then applying electricity to heat the working head of the device, said head having certain obstruction contacting and cutting means which also retain the obstructive matter until the heat applied reduces such matter to ashes or at least reduces it sufficiently by such heat until it is readily flushed out of the conduit.

In the accompanying drawing,—

Figure 1:
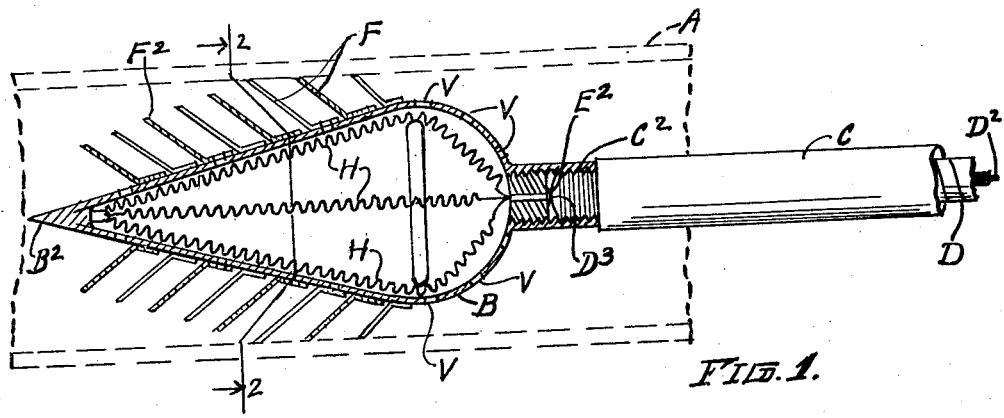
Fig. 1 is a longitudinal sectional elevation of my device in which coiled electric heating elements are used.
Figure 3:
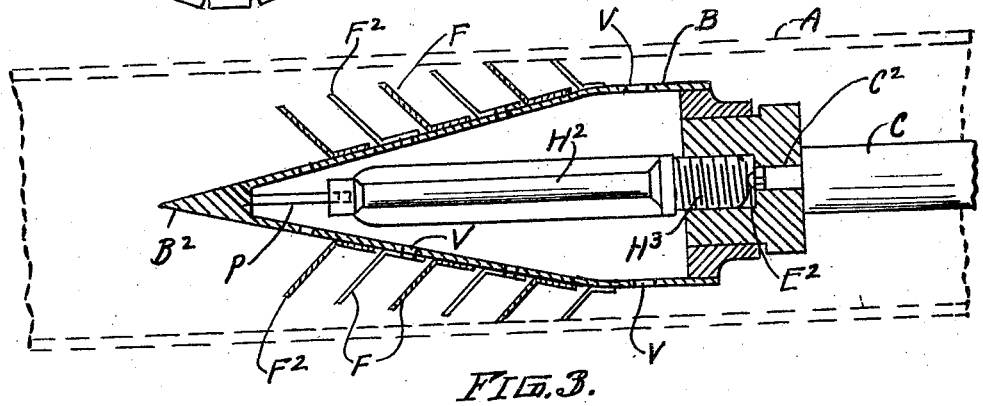
Fig. 3 is a modification of Fig. 1, embodying a preferred type of heating element.

In Figs. 1 and 3 the conduit of any kind to be cleaned by the device is designated A and is shown in dotted lines only.

My device comprises a clearing head or simply a head member B adapted to be inserted in a conduit and reciprocated therein any desired distance by means of an actuator C preferably removably secured as at C2 to the rear end of head B. The actuator may be a hollow flexible cable in which is retained a preferably heavily insulated electric cable D, the current carrying wire D2 of which has a forward terminal at D3 for contact with an electric terminal E2 of a heating element within head B.

Figure 2:
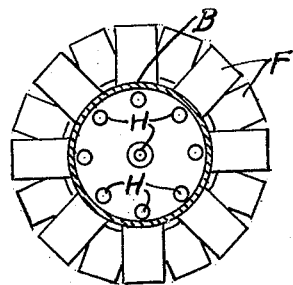
Fig. 2 is a sectional elevation as on line 2—2 of Fig. 1.

The head B comprises preferably an elongated hollow member tapered forwardly to a point B2. On the main length of said head are provided a series of radially projecting fixed metal fingers F preferably in circular rows spaced apart longitudinally, the fingers of one row alternated with the fingers of the adjoining row. The outer edges of said fingers may be beveled as F2 to provide cutting edges, it being further understood that all the fingers preferably project forwardly and in inclined positions and are made of material which may be heated to a high temperature. The said fingers or blades need not necessarily all contact with the walls of a conduit but are flexible to some extent so that when the head is pushed through a conduit the fingers have a cutting action and will spring out or in to a limited extent if contacting with comparatively solid obstructions. When the head is worked solidly into an obstruction, electric current is applied and the heating element H (as in Fig. 1) or H2 (as in Fig. 2) heats the head B and its fingers to such extent that the obstruction is burned until it is reduced to an ash or at least until it is reduced enough to flush the obstruction from the conduit.

A main cause of sewer pipe clogging is roots of trees and shrubs which work into and through the conduit joints thence form a matted mass within the conduit and which grow rapidly because of the liquid flow in the conduit.

Obviously my device will work into such mass of roots cutting them up to some extent, the roots consequently filling up the spaces between the fingers. When the head is then heated as required the roots or other obstructions are burned as described.

The heating element used is shown as a series of resistance coils H in Fig. 1 arranged close to the inner walls of the head to most rapidly heat the latter and its fingers. In Fig. 3 the heating element is of the well known unit type having a threaded socket end H3 for contact, a main bar like heating element or electrode, the forward end of which is slidably retained as on a fixed pin P to allow for expansion. This latter type of heating element is preferred as it provides an intense heat more rapidly than the electric resistance coils shown in Figs. 1 and 2.

V designates vents in the body member B.

The use of my device has been fully disclosed in the foregoing specification. It might be further stated, however, that the particular form of head may be modified for different conditions. The shell of body B and the finger members F must be made of any suitable metal which will stand intense heat without distorting them. The head may be made comparatively short or nearly round for the purpose of more ready passage of it through curved pipes, elbows, etc.

I claim:

1. A pipe cleaning device of the class described comprising a hollow body preferably elongated and adapted to be inserted in a sewer pipe or the like for reciprocating movement therein, means for detachably connecting said body member to an elongated flexible member insertable in a conduit, electric conducting means in said flexible member, electric heat generating means within said body and outwardly directed cutter and burning means fixed on the exterior of said body comprising fingers directed forwardly.

2. The structure specified in claim 1 in which said fingers comprise a series of spaced circular rows of flat metal members and the outermost edges of said members provided with cutting edges.

3. A conduit clearing device comprising a hollow, elongated shell adapted to be reciprocated longitudinally within a conduit, an electric heating element within the shell and means for conducting electric current thereto; outwardly and forwardly directed finger members fixed on the exterior of said shell, and said shell provided with suitable vents, and some of said fingers arranged to provide yielding contact with the inner walls of a conduit.

4. The structure specified in claim 3 in which said fingers are arranged in circular rows about the shell and the fingers extend radially and in alternating staggered positions in the adjacent rows.

In testimony whereof, I affix my signature.

WALTER SCHOENFELD.